RACKS OF ELECTRICAL APPARATUS

INVENTORS
ALBAN EDWARD HARRIS
CLIVE DESMOND THORNTON NEEDLE
BY Kirschstein, Kirschstein & Ottinger
ATTORNEYS INVENTORS
ALBAN EDWARD HARRIS
CLIVE DESMOND THORNTON NEEDLE
BY Kinzler, Kinzler & Ottinger
ATTORNEYS

RACKS OF ELECTRICAL APPARATUS

Filed Aug. 20, 1963 5 Sheets-Sheet 3

INVENTORS
ALBAN EDWARD HARRIS
CLIVE DESMOND THORNTON NEEDLE
BY Kinderton, Kinderton & Ottinger
ATTORNEYS

RACKS OF ELECTRICAL APPARATUS

INVENTORS
ALBAN EDWARD HARRIS
CLIVE DESMOND THORNTON NEEDLE
BY Kinzbergen, Kinzbergen & Ottinger
ATTORNEYS INVENTORS
ALBAN EDWARD HARRIS
CLIVE DESMOND THORNTON NEEDLE
BY Kirchstein, Kirchstein & Ottinger
ATTORNEYS United States Patent Office 3,280,377
Patented Oct. 18, 1966

3,280,377
RACKS OF ELECTRICAL APPARATUS

Alban Edward Harris, Coventry, and Clive Desmond Thornton Needle, Rugby, England, assignors to The General Electric Company Limited, London, England
Filed Aug. 20, 1963, Ser. No. 303,244
Claims priority, application Great Britain, Aug. 22, 1962, 32,257/62
6 Claims. (Cl. 317—100)

This invention relates to racks of electrical apparatus. More particularly, but not exclusively, the invention is concerned with racks of electronic apparatus.

One object of the present invention is to provide a rack of electrical apparatus which is of novel construction and which has provision for cooling the apparatus.

In a rack of electrical apparatus in accordance with the invention, at least some of the individual components of the apparatus are disposed in a duct which is inclined to the horizontal when the rack is in use, the arrangement being such that, during use, air flows through the duct to effect convection cooling of the components disposed therein.

According to a feature of the present invention, the individual components of a rack of electrical apparatus are disposed on a plurality of shelves arranged one above another, at least one pair of adjacent shelves defining a duct which is inclined to the horizontal when the rack is in use, the arrangement being such that, during use, air flows through the duct to effect convection cooling of the components disposed therein.

Preferably the duct is inclined downwards from the front of the rack.

According to another feature of the present invention, the individual components of a rack of electrical apparatus are disposed on a plurality of shelves arranged one above another, each pair of adjacent shelves defining a duct which is inclined downwards from the front of the rack when the rack is in use, the arrangement being such that, during use, air flows through each such duct to effect convection cooling of the components disposed therein.

Preferably the duct or each duct, as the case may be, is inclined at an angle of between 12° and 20° to the horizontal.

The components disposed in a duct may be mounted on a plurality of panels which lie side by side, each panel generally in a plane at right-angles to the front of the rack, and these panels are carried by one of said shelves, preferably the lower shelf of the pair defining the duct. Each panel may be located by guides which permit removal of the panel. Preferably each panel has an associated multi-contact plug-and-socket connector for the purpose of making electrical connections to the components carried by the panel, one of the co-operating portions of this connector being part of the panel and being provided at the rear thereof and, when the panel is removed, this portion being separated from the other portion of the connector with which it normally mates. The front surface of all the panels carried by a shelf may be co-planar and the duct that lies behind said front surfaces may be normal thereto.

Figure 1:
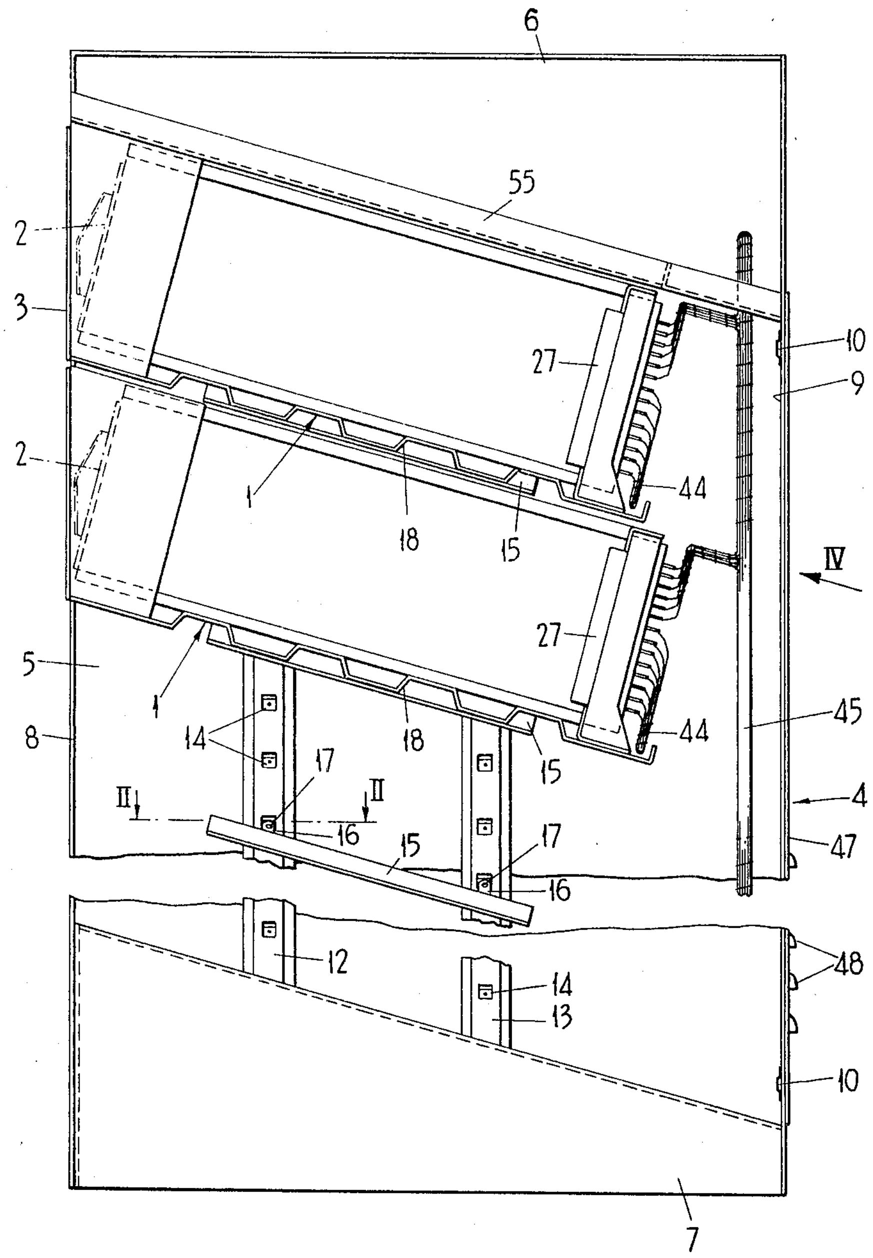
Figure 2:
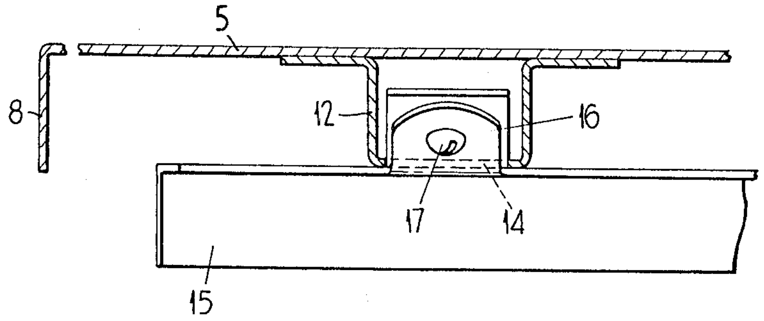
Figure 4:
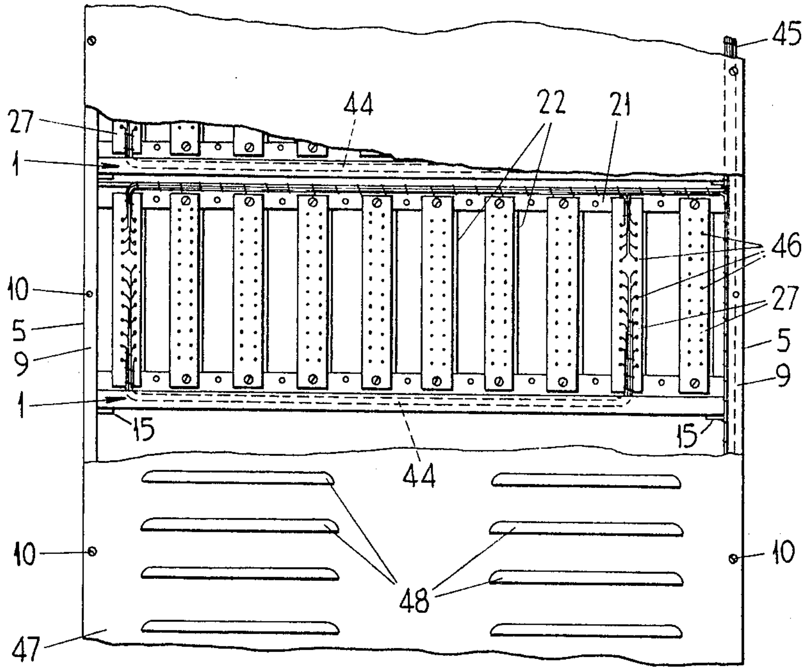
Figure 3:
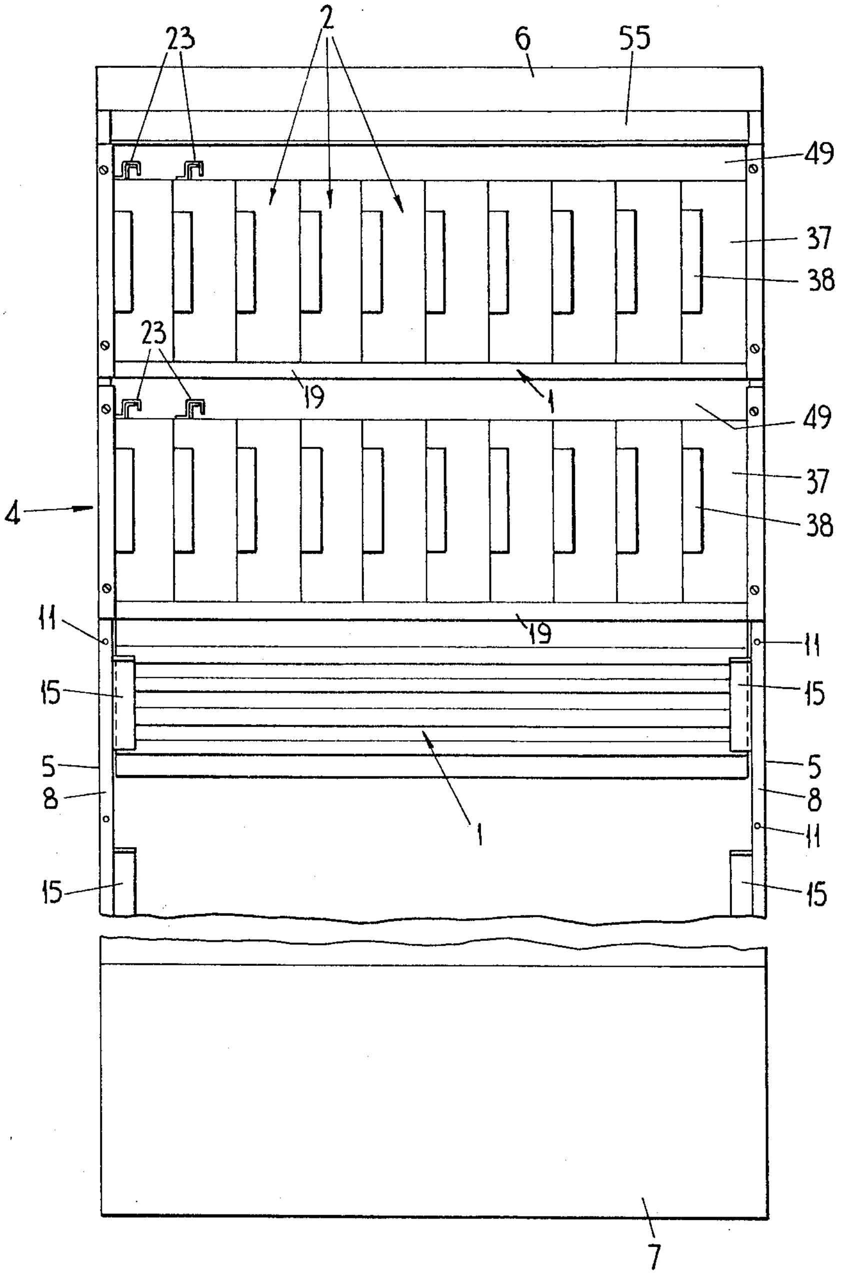
Figure 5:
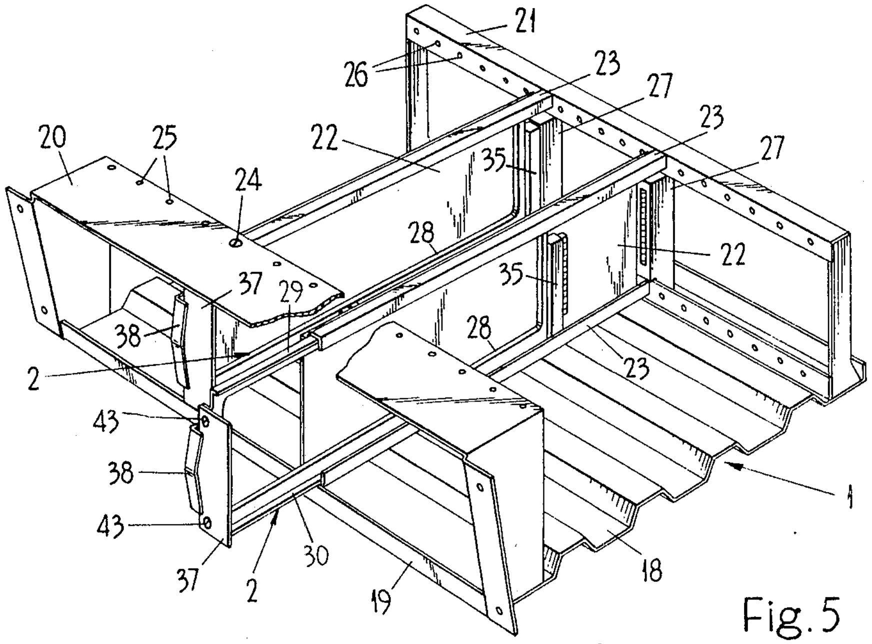
Figures 6, 7:
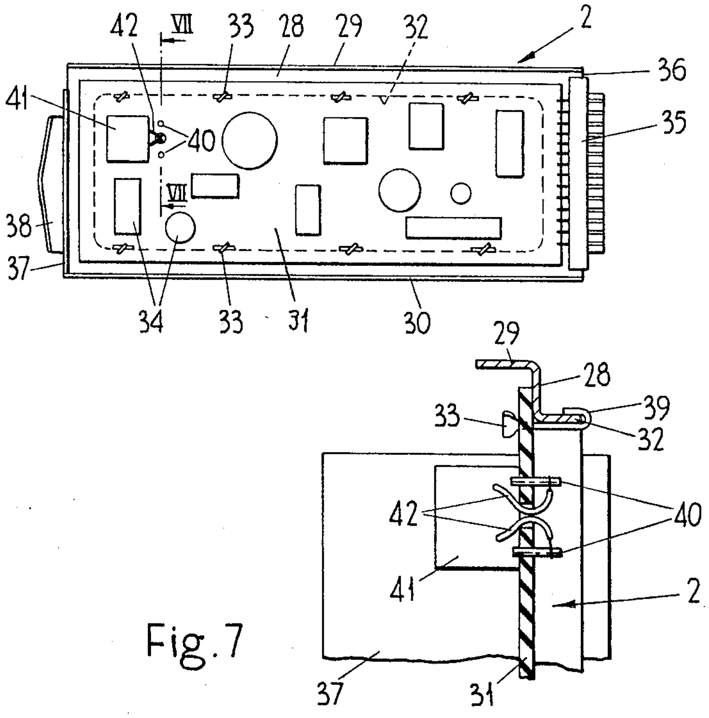
Figure 8:
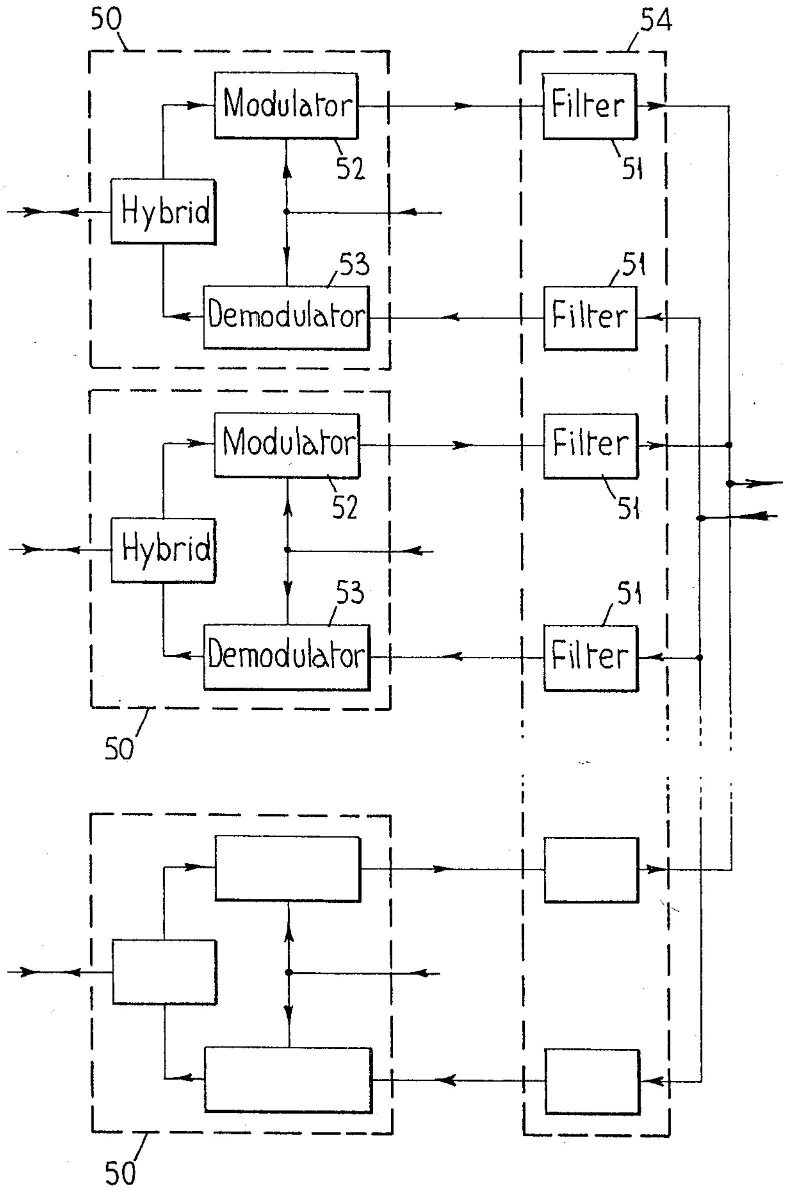

One example of a rack of electrical apparatus in accordance with the invention will now be described with reference to the accompanying drawings, in which:

FIGURE 1 is a side elevation of the rack with one side panel removed to show the shelves, FIGURE 2 is an enlarged sectional view on the line II—II of FIGURE 1, FIGURE 3 is a front elevation of the rack, FIGURE 4 is a rear elevation, in the direction of the arrow IV in FIGURE 1, with a part of the cover plate broken away, FIGURE 5 is a perspective view on a shelf showing two panels in position, FIGURE 6 is a side elevation of a panel in which individual electric components are shown schematically, FIGURE 7 is an enlarged sectional view on the line VII—VII of FIGURE 6, and FIGURE 8 is a block schematic diagram of apparatus which may be carried by a single shelf in the rack.

Referring to FIGURES 1, 2, 3, 4 and 5, the apparatus is mounted on a plurality of shelves 1 which are disposed one above another. The individual items of apparatus carried by each shelf 1 are in fact mounted on a plurality of panels 2 which lie side by side across the shelf 1 so that each panel 2 lies generally in a vertical plane that is at right angles to the front 3 of the rack 4.

The framework of the rack 4 comprises two side members 5, only one of which is shown in FIGURE 1, which are connected at the top and bottom thereof respectively to a top member 6 and a bottom member 7. These members 5, 6 and 7 are preferably formed from sheet steel. The two vertical edges 8 and 9 of each side member 5 are bent at right angles towards the other side member 5 so as to form a shallow trough and thereby strengthen the sides of the rack 4 and also provide fixing points 10 for rear covers and anchoring positions 11 for the shelves.

Two elongated members 12 and 13 each having a flanged channel-shaped cross-section are secured to the inside of each of the side members 5 so that the channel-shaped portions thereof project towards the other side member 5. These two members 12 and 13 are spaced apart and extend vertically the full height of the side member 5. A plurality of rectangular apertures 14 are provided in the bottom of the channel-shaped portion of each of these members 12 and 13, the apertures 14 being regularly spaced along the length of each member 12 or 13.

Each shelf 1 is supported by means of two generally L-section support members 15 which are individual thereto. Each of these support members 15 has a pair of tabs 16 projecting therefrom and these tabs 16 hook respectively into a pair of apertures 14, one in each of the two elongated members 12 and 13 and are retained by self tapping screws 17 which pass through the tabs 16 into bent-out portions of the elongated members 12 and 13. The apertures 14 into which each pair of tabs 16 project are such that each support member 15 is inclined downwards from the front 3 of the rack at an angle of 15°.

Each member 15 acts as a runner to support the associated shelf 1, the load of this shelf 1 being borne by the tabs 16 on the support members 15 and not by the retaining screws 17.

Each shelf 1 is in the form of a corrugated metal sheet 18, the corrugations extending parallel to the front edge 19 thereof and serving to stiffen the shelf.

Each shelf 1 has two rectangular frames 20 and 21 secured one to the front and one to the back of the shelf. These frames 20 and 21 extend right across the shelf 1 and are of such a height that, when the shelf is in position, there is only a small clearance between them and the shelf immediately above.

Extending between the frames 20 and 21 of each shelf there are a plurality of flat generally planar metal members 22 of rectangular shape which lie parallel to one another across the shelf 1. (When the shelf 1 is installed, these members 22 are parallel to the side of the rack 4). Portions of these members adjacent the top and bottom edges thereof are bent over to provide a air of guides 23 for the panels 2 and the members 22 are held in position by means of self tapping screws 24 which pass through the frames 20 or 21 into the members 22. For this purpose the two frames 20 and 21 are provided with rows 25 and 26 of regularly spaced holes, say .2 inch apart, so that shelves 1 to receive different numbers of panels 2 or panels having different widths can readily be assembled from standard components.

Adjacent to each of the planar members 22 there is a multi-contact electric socket 27 fixed to the rear frame 21 of the shelf 1. Preferably the socket has a single row of contacts which lie parallel to the rear edge of the associated planar member 22.

Referring also to FIGURES 6 and 7, each of the panels 2 comprises a generally rectangular frame 28 which is formed from sheet metal and most of the centre of which is open. Portions of the frame adjacent to the two longer edges 29 and 30 thereof are bent over at right angles and are adapted to lie in a pair of the guides 23 when the panel 2 is in position on a shelf 1. A planar member 31 of electric insulating material, for example a member of phenolic resin board, is held against the frame 28 so as to be over the open centre thereof. This planar member 31 is held in place by means of a plurality of metal clips 39 which fit over the inside edge 32 of the longer sides of the frame 28 and which each have a tag 33 that passes through the planar member 31. During assembly these tags 33 are twisted, on the side of the member 31 remote from the frame 28, so as to hold the member 31 captive and at the same time retain the clips in place.

A plurality of pins 40 pass through the planar member 31 of each panel 2 and the leads of electrical components 34, for example resistors, capacitors and transistors are soldered to these pins 40. In FIGURE 6 for clarity only the pins 40 associated with the component 41 are shown. The components 34 lie on the side of the planar member 31 remote from the frame 28 while the connecting leads 42 of, for example, the component 41 pass through the planar member 31 and are soldered to the pins 40 on the other side thereof. A multi-contact plug 35 is secured to the rear shorter side 36 of the frame 28 so as to engage with one of the multi-contact sockets 27 when the panel 2 is in position on a shelf 1.

Interconnections between the pins 40 and the plug 35 of each panel 2 are provided on the side adjacent to the frame 28 by conventional wiring soldered to the pins 40 and to the plug 35.

Alternatively the interconnections may be made by means to a metal pattern (not shown) formed on that side of the planar member 31 of the panel 2 by a printed circuit technique.

The single planar member 31 of a panel 2 may be replaced by a plurality of smaller members disposed side by side along the frame 28, these members being interconnected with one another and with the multi-contact plug 35 in smaller manner to that previously discribed. This arrangement gives greater flexibility in making up panels 2 having different circuits.

The frame 28 of each panel 2 has a rectangular metal plate 37 and a handle 38 fixed by screws 43 to the shorter side thereof remote from the multi-contact plug 35. This metal plate 37 forms the front of the panel 2 and extends from the lower edge 30 of the frame 28 nearly up to the top edge 29. The width of this plate 37 varies from panel to panel in dependence upon the size of components 34 mounted on the panel and is chosen in conjunction with the spacing of the planar metal members 22 of a shelf 1 so as to present a continuous flat surface across the front of the shelf. This surface is, of course, inclined at 15° to the vertical in the rack 4. The handle 38 is provided to facilitate the easy insertion or removal of a panel into or from the rack 4.

The front plate 37 of a panel 2 may carry one or more manually-operable switches, control knobs or test sockets (not shown). These items are however disposed so that they do not project in front of the imaginary vertical plane that bounds the front of the rack 4. This plane is determined by the front bent-over portions 8 of the side members 5 of the rack 4 (see FIGURE 1). Accordingly any of these items that do project in front of the front plate 37 of a panel 2 are located towards the top of the plate where there is more room in the "wedge" of available space between this plate 37 and the imaginary plane.

Referring again to FIGURES 1 and 4, the space behind the shelves 1 in the rack 4 is utilised for wiring between the multi-contact sockets 27, associated with each shelf 1, for wiring between these sockets 27 associated with different shelves and for cabling to the rack 4 from outside. The wires 44 connecting the multi-contact sockets 27 associated with any one shelf are preferably located in the "wedge" of space bounded by those multi-contacts 27 and by an imaginary vertical plane defined by the rear edges of all the shelves 1 in the rack 4. This wiring may be carried out before the shelf 1 is installed in the rack framework. Cables 45 from outside the rack 4 enter via an aperture (not shown) at the rear of the top member 6 and pass down the rack at the rear of the shelves 1. The individual conductors of these cables are brought down to the appropriate multi-contact sockets 27 and are connected for example by soldering or wrapping directly to the terminal tags 46 thereof.

The back of the rack framework is covered by one or more cover plates 47 secured to the bent-over portions 9 of the side members 5 of the framework. Louvres 48 are provided in the plates 47 for the ingress of air. This air passes by convection through the duct formed by adjacent pairs of shelves 1 so as to assist cooling the components mounted therein; the air leaves the rack 4 through the gaps 49 left above the front plate 37 of each panel 2. The panels may be spaced apart from each other to give increased volume for the passage of the cooling air which then leaves the rack both at the top and side of the front plates 37. As far as components mounted on the top shelf are concerned, a duct for the passage of cooling air is formed between that shelf and a further member 55, which forms part of the rack framework and which extends between the two side members 5.

The apparatus described above may form part of the terminal station transmitted and receiving equipment of a multichannel carrier telephony system. In this case each shelf 1 may carry the apparatus of a twelve-channel group, as indicated in FIGURE 8, each of the twelve channels having one panel 50 (corresponding to a panel 2 in FIGURES 6 and 7) that is individually associated therewith. It will be appreciated that one of said planar metal members 22 is disposed between the adjacent panels 50 of different channels and acts as a screen.

The required frequency changing is effected in a single step and the apparatus associated with all the twelve channels is preferably the same except for the pass frequencies of band-pass filters 51, which may be crystal filters, following each channel modulator 52 and preceding each channel demodulator 53. With the arrangement shown all the channel panels 50 are identical while the filters 51 for all the twelve channels are located on a separate panel 54 carried by the same shelf. A plurality of shelves 1 of the rack 4 may carry identical apparatus, each in respect of a twelve-channel group, while apparatus carried by a further shelf 1 of the rack 4 may serve to combine the twelve-channel groups to form a super-group.

It is to be understood that one or more of the shelves 1 in the example described above may, within the scope of the invention, be replaced by other equipment (not shown) supported by suitable brackets (not shown) which project into the fixing apertures 14 in the elongated members 12 and 13 in the same way as the support members 15.

What we claim is:

1. A rack of electrical apparatus comprising a framework, a pair of planar side members mounted on the framework to lie vertically and parallel to one another one on either side of the framework, a plurality of shelves, shelf support means which are secured to the framework and upon which said shelves rest to lie parallel to one another and inclined to the horizontal at an angle of between 12° and 20° so as to form with said side members a plurality of ducts that are disposed one above the other, a plurality of guides, means fixedly to secure said guides on said shelves, a plurality of panels which are supported and located each by an associated one of said guides so that a plurality of these panels lie side by side generally parallel to one another in each duct, each panel carrying a plurality of interconnected electrical components and having a front portion that extends across only part of the space between the two shelves defining the duct in which that panel lies so as to leave a gap through which may pass air to effect convection cooling of the components, a plurality of two-part electric connectors one for each of said panels, means fixedly to secure a first part of each connector on its respective panel, means to make electrical connections between the first part of each connector and components carried by the respective panel, means fixedly to secure the second part of each connector on the shelf on which is mounted the guide which supports the panel associated with that connector, and means to make electrical connections between the second parts of the connectors.

2. A rack of electrical apparatus comprising (a) a pair of generally planar members, (b) means to secure said planar members in a mutually parallel spaced arrangement to form a rack framework in which said planar members are vertically disposed, (c) at least two substantially imperforate shelves, (d) means to mount said shelves in a mutually parallel spaced arrangement one above another between said planar members such that each shelf is inclined at an angle between 12° and 20° to the horizontal, (e) whereby an inclined duct is defined by a pair of adjacent shelves and said planar members, (f) a plurality of electrical components, and (g) means to mount said components between said pair of adjacent shelves so that said components lie within said duct.

3. A rack of electrical apparatus according to claim 2 wherein the means to mount the components comprises a plurality of panels which lie side-by-side within the duct, each panel being generally in a plane parallel to the planar members.

4. A rack of electrical apparatus according to claim 3 wherein there are provided a plurality of guides and means to mount said guides on the shelves, and each panel is located by a pair of said guides.

5. A rack of electrical apparatus according to claim 4 in which one of the cooperating portions of a multi-contact plug-and-socket connector is secured to the rear edge of each panel and the other portion of the connector is secured adjacent the guides by which the panel is located.

6. A rack of electrical apparatus according to claim 3 wherein each panel is provided with a planar front member at right angles to the plane of the panel, the front members of all the panels carried by a shelf being coplanar when said panels are fully inserted.

References Cited by the Examiner

UNITED STATES PATENTS

| | | | |
|---|---|---|---|
| 2,169,109 | 8/1939 | Muller. | |
| 2,516,184 | 7/1950 | Christie | 317—100 |
| 2,843,806 | 5/1958 | O'Neil | 317—100 |
| 3,198,991 | 8/1960 | Barnett | 317—101 |

FOREIGN PATENTS

| | | |
|---|---|---|
| 203,624 | 6/1956 | Australia. |
| 168,316 | 8/1959 | Sweden. |

ROBERT K. SCHAFER, *Primary Examiner.*

KATHLEEN H. CLAFFY, ROBERT S. MACON, *Examiners.*

M. GINSBURG, *Assistant Examiner.*